Nov. 14, 1939.　　　W. E. JENKINS　　　2,179,633

AUTOMATIC SAFETY DEVICE

Filed July 24, 1937

INVENTOR
Wayne E. Jenkins
BY
Crosby Gauthier
ATTORNEY

Patented Nov. 14, 1939

2,179,633

UNITED STATES PATENT OFFICE 2,179,633

AUTOMATIC SAFETY DEVICE

Wayne E. Jenkins, Los Angeles, Calif., assignor to Domestic Manufacturing Company, Inc., Los Angeles, Calif., a corporation of California Application July 24, 1937, Serial No. 155,457

4 Claims. (Cl. 158—117.1)

This invention relates to automatic shut-off devices for use in conjunction with gas and other fluid fuel burners and has to do more especially with devices designed to function in event of extinction of a pilot flame—the primary object of the invention being to provide a compact and reliable mechanism which will automatically shut off the fuel supply to both a pilot and main burner within a very short time following extinction of the pilot flame and which renders it a very simple matter to relight the pilot and reset the automatic shut-off mechanism. A further object is to provide a device which will absolutely preclude the pilot flame being re-established without the automatic shut-off mechanism being reset.

Referring to the drawing.

While I have illustrated my invention applied to a domestic automatic water heater, it is to be borne in mind that this is but one of many uses to which it may be put. It is applicable to any situation involving the use of a pilot flame of the gas or other fluid-fuel type.

Figure 1:
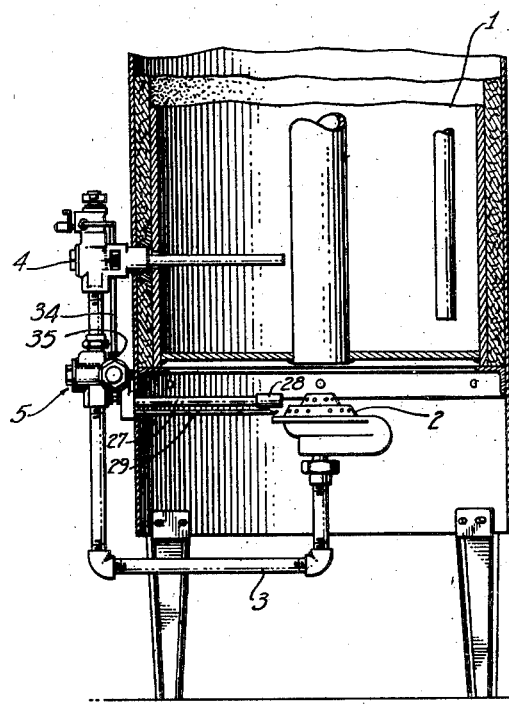
Fig. 1 illustrates the lower portion of a domestic automatic water heater and shows, among other details, the main burner, the thermostatic regulator and the device of the present invention, as well as a portion of the water tank and the supporting structure therefor.

In Fig. 1, which depicts the lower portion of a domestic automatic water heater, reference numeral 1 identifies the water tank; 2 is the main burner; 3 the fuel supply pipe to the main burner; 4 is a conventional thermostatic regulator which serves automatically to turn on and off the gas to the main burner in conformity with changes in the temperature of the water; and 5 designates, as a whole, the device of the present invention—said device being automatically operative to shut off the gas to both the main burner and pilot burner if and when the pilot flame, for any reason, becomes extinguished.

In normal operation the pilot flame burns continuously and must, of course, have a continuous supply of fuel to maintain it. The main burner, on the contrary, operates intermittently, its fuel supply being turned on automatically by the thermostatic regulator whenever the temperature of the water in the tank drops below some predetermined value—being turned off automatically when the temperature has risen to some other predetermined upper value.

If the pilot flame should for any reason become extinguished, the main burner would not be relighted and, since the thermostatic regulator 4 functions to turn on the gas when the temperature has dropped below a certain point, it follows that a failure of the pilot would ordinarily result in a continuing flow of gas and, possibly, a situation fraught with great peril.

Figure 4:
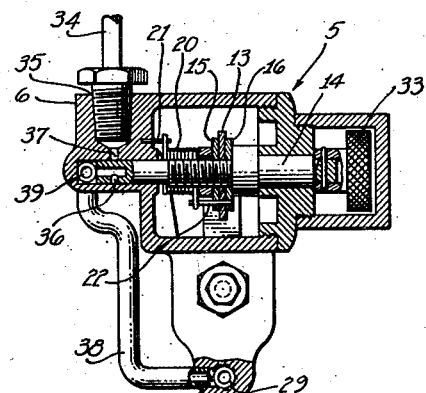
Fig. 4 is a cross-sectional view taken along the line 4—4 of Fig. 2.
Figure 3:
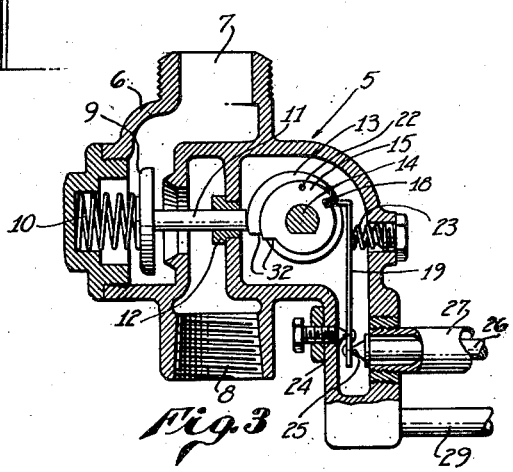
Fig. 3 is a reproduction of a portion of Fig. 2 but showing the trigger mechanism in its set or cocked position.
Figure 2:
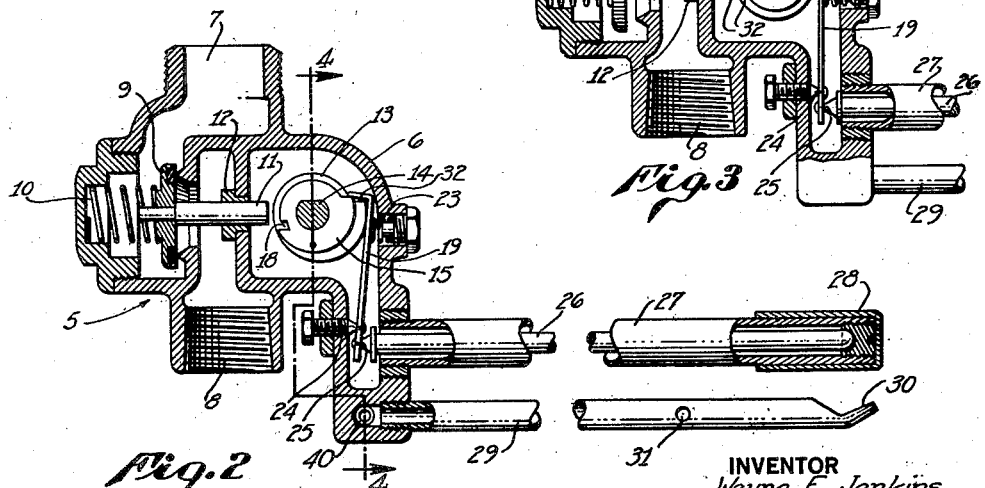
Fig. 2 is a longitudinal view, principally in section but partly in elevation, of the subject safety device.

The device of the present invention, which is illustrated in detail in Figs. 2, 3 and 4, and identified in Fig. 1 by reference numeral 5, is designed to automatically shut off the gas to both the main burner and pilot burner almost immediately following a failure of the pilot flame, and is further designed to ensure against all possibility of the gas supply being re-established, following an operation of the device, without the pilot flame being re-lighted and maintained and/or without the safety mechanism being re-set to operate in event of a subsequent failure of the pilot.

My device is shown inserted in the gas supply line between the main burner 2 and the automatic regulator 4, but the set-up would function no differently if the automatic regulator 4 were, instead, interposed between the main burner and the device 5.

My device comprises a body casting 6, usually brass, having an inlet opening 7 and outlet opening 8. Inside the body casting is a valve disc 9 which, when seated, as illustrated in Fig. 2, serves to interrupt the flow of gas through the device and, thus, is capable of functioning to cut off the fuel supply to the main burner. A coil spring 10 is operative to press the valve disc against its seat, but is normally prevented from so doing by reason of the fact that the valve is held open by the trigger mechanism which will operate to permit valve disc 9 to be seated only in event of the pilot flame becoming extinct.

Disc 9 has a stem 11 which is slidably supported in a bushing 12, the end of said stem being normally pressed, by virtue of spring 10, against the periphery of a cam 13 (see Fig. 3)—said cam being a part of the trigger mechanism which characterizes my invention. When cam 13 is turned to the set or cocked position, as depicted in Fig. 3, it serves to hold the valve disc in open position, but when the cam is rotated to the position shown in Fig. 2 it allows disc 9 to be seated.

Cam 13 is rigidly secured to a shaft 14 with which it is manually rotatable. Secured to either side of cam 13 are a pair of identical latch plates 15 and 16, each of which has a notch 18 which, as shown in Fig. 3, is designed to receive the end of latch member 19—said end being bifurcated to permit it to straddle the edge of the cam and engage the two latch plates.

Encircling shaft 14 (see Fig. 4) is a coil spring 20, one end of which engages a pin 21 (see Fig. 4) driven into the body casting while the other end engages a pin 22 which is driven through cam 13 and latch plates 15 and 16. Spring 20 is normally under torsion (normal being the condition illustrated in Fig. 3) and serves to impart rotational force to shaft 14 and cam 13 in such a direction as to turn the cam to the position in which it is shown in Fig. 2, if and when it is permitted to do so, as a consequence of the withdrawal of latch 19 from notches 18 in latch plates 15 and 16.

The function of latch 19 is to lock cam 13 and shaft 14 against the torsional force of spring 20 and thus normally to maintain the cam in the position in which it is shown in Fig. 3—the main valve being thus held open so long as the pilot flame continues to burn.

Latch 19 is pressed against latch plates 15 and 16 by a coil spring 23 and it is pivoted at 24 and 25—the latter being the pointed end of a rod 26 which is one of the members of a thermostat element of the conventional tube and rod type—which comprises also a copper tube 27. Rod 26, according to usual practice, is made of Invar steel or carbon or some other material having a low temperature coefficient of expansion, or a combination of such materials.

At the tip end of the thermostat element is a cap 28 of stainless steel upon which the pilot flame impinges. Just below the thermostatic element and extending parallel thereto is a pilot tube 29, the tip end of which is formed to constitute a jet at 30. Gas emerging from tube 29 at the jet 30 is mixed with air which is drawn into the tube at 31. The gas being ignited at the jet, the resulting flame constitutes the pilot flame which, as will be seen from an inspection of Fig. 1, is situated immediately adjacent the main burner so as to be effective to re-light the main burner each time the gas is turned on at the regulator 4.

Manifestly, the thermostatic element of my device is continuously hot so long as the pilot flame continues to burn; and since copper has a substantial thermal coefficient of expansion, the rod 26, as viewed in Fig. 2, is normally moved to the right—which permits spring 23 to hold the latch in locking engagement with notches 18, as per Fig. 3. So long as that condition obtains valve disc 9 will remain in open position as portrayed in Fig. 3; but if at any time the latch should be withdrawn from notches 18, the cam and shaft would be released and would be turned by spring 20 to the position shown in Fig. 2—which would result in shutting off the gas to the main burner. Such a result will follow from an extinction of the pilot flame, due to the fact that the concomitant cooling of copper tube 27 causes rod 26 to move to the left—which forces the latch to rotate about pivot 24 against the pressure of spring 23. When such a movement of the latch has proceeded far enough to withdraw the latch from notches 18 the cam is free to rotate; but it can only rotate about 180 degrees because latch plates 15 and 16 are provided with shoulders at 32 which operate as stops to limit the rotational movement thereof—see Fig. 2.

The above-described trigger mechanism is designed to be set for operation and re-set, following an operation, by manually rotating shaft 14 together with the cam and latch plates against the torsional opposition of spring 20; and to that end a finger-operated knob 33 (see Fig. 4) is attached to the outer end of shaft 14—said knob being, preferably, knurled on its periphery.

To re-set the device, following an operation, knob 33 is rotated a half turn so as to move the cam from the position in which it is shown in Fig. 2 to that in which it is shown in Fig. 3 and it is held in the Fig. 3 position, manually, while the pilot is re-lighted and thereafter until the thermostatic element has moved latch 19 into locking engagement with notches 18.

Ordinarily it requires about one or two minutes for the thermostatic element to respond to the heat of the pilot flame sufficiently to move the latch into locking engagement with notches 18, and it is necessary for the person setting the device for operation, or re-setting it, to hold the knob in the wound up position during that period of time. If he lets go of the knob before the device is re-set, the pilot flame will be extinguished and the gas to the main burner cut off as before. Hence, it is impossible to re-establish the fuel supply without re-setting the automatic shut-off mechanism.

Since in the normal operation of the installation of Fig. 1 it is the intent to keep the pilot flame burning continuously, it is necessary (with the arrangement depicted) to obtain gas for the pilot from a point in the supply line in advance of regulator 4. Otherwise the pilot flame would be extinguished each time the main burner fuel supply was cut off by the operation of the temperature regulator. For that reason the pilot gas supply is brought in through a small pipe 34 (see Fig. 1) which (as shown) is tapped into the temperature regulator 4 at a point in advance of the valve in that device; and it is, in turn, connected at 35 into the body casting 6 at a point adjacent the end of shaft 14. As clearly shown in Fig. 4, the end of shaft 14 is drilled both axially and transversely—the transverse hole 36 being positioned to register with an aperture 37. A small tube 38 is connected at 39 with a small compartment in the body casting at the end of shaft 14 and its other end is connected at 40 with one end of the pilot tube 29. There is, then, under normal conditions, a continuously open passageway for gas to the pilot jet—which passageway is shut off only in event of a rotation of shaft 14 to the shut-off position—which occurs when and only when the trigger mechanism is operated by reason of a failure of the pilot.

Although I prefer in all instances to provide for automatically shutting off the pilot fuel supply as well as the main burner fuel supply, in event of a failure of the pilot, it would nevertheless be permissible and within the purview of my inventive concept to omit the automatic pilot shut-off in some cases. Hot water heaters and other heating devices are generally vented and if the gas is non-poisonous and non-asphyxiating and volatile enough to pass out through the vent there would, I think, be no great hazard in permitting the pilot gas to escape. If the gas used is poisonous or asphyxiating or is heavier than air and, therefore, prone to settle near the floor and create an explosive hazard—propane, for example—it would hardly be permissible to omit the pilot shut-off; and in no case do I recommend it.

It is also within the contemplation of my invention to provide a device which automatically shuts off only the pilot fuel supply—it being entirely possible, of course, to provide another mechanism for shutting off the main burner fuel supply.

What is claimed is:

1. A thermostatically-controlled device for automatically shutting off the fuel supply to a main burner in response to an extinction of a pilot flame, comprising: a normally open valve situated in the main burner fuel supply line, a manually rotatable shaft having mounted thereon and rotatable therewith a cam operative to open and hold open said valve, a spring operative to rotate said shaft and said cam for effecting a closure of said valve, a latch-plate mounted on and rotatable with said shaft, a fulcrumed latch member having a relatively long lever arm the free end of which is operative to latchingly engage said latch-plate and, when so engaged, to restrain said cam against rotation by said spring, and a thermostat of the tube and rod type in operative engagement with said latch member at a point relatively close to its fulcrum, the arrangement being such that a small movement of said thermostat transmitted to said latch member will bring about a relatively large movement of the free end of said long lever arm and will cause said latch member to disengage said latch plate and permit said valve to close whenever the pilot flame may become extinguished, said thermostat being situated adjacent the pilot flame and responsive thereto.

2. A thermostatically-controlled device for automatically shutting off the fuel supply to a main burner in response to an extinction of its pilot flame, said device comprising: a body casting having a fuel passageway therethrough, a normally open valve situated in said passageway and operative, when closed, to shut off the fuel supply to the main burner, a manually rotatable shaft journaled in said body casting, a cam mounted on and rotatable with said shaft and operative to open and hold open said valve, a spring operative to rotate said shaft and said cam for effecting a closure of said valve, a latch plate mounted on and rotatable with said shaft, said latch plate having a notch, a spring actuated fulcrumed latch member having a relatively long lever arm the free end of which is engageable with said notch and operative when so engaged to restrain said shaft and cam against rotation, a thermostat of the tube and rod type in operative engagement with said latch member at a point relatively close to its fulcrum, said thermostat being operative to effect withdrawal of the free end of said long lever arm from said notch and thereby cause a closure of said valve in response to a failure of the pilot flame, and a pilot tube attached to and extending from said body casting, said pilot tube having a jet adjacent said thermostat.

3. A thermostatically-controlled device for automatically shutting off the fuel supply to both a main burner and its pilot in response to an extinction of the pilot flame, said device comprising: a body casting having a fuel passageway therethrough, a normally open valve situated in said passageway and operative, when closed, to shut off the fuel supply to the main burner, a manually rotatable shaft journaled in said body casting, a cam mounted on and rotatable with said shaft and operative to open and hold open said valve, a spring operative to rotate said shaft and said cam for effecting a closure of said valve, a pilot burner attached to said body casting, a pilot fuel supply rotary shut-off valve in said body casting, said shaft constituting the rotary element of said last-mentioned valve, said last-mentioned valve being operative to shut off the supply of fuel to said pilot burner simultaneously with the closure of said first-mentioned valve, and a thermostatically-controlled trigger mechanism for normally holding said shaft in the "open valve" position, said trigger mechanism being operative in response to a failure of the pilot flame to release said shaft and thus permit said valves to close, said trigger mechanism including a notched latch plate mounted on and rotatable with said shaft and a latch member normally engaging but withdrawable from the notch in said latch plate, said latch member comprising a relatively long lever arm the free end of which engages the notch in said latch plate, a spring tending to hold said latch member in latching engagement with said latch plate, and a thermostat operatively connected with said latch member at a point relatively close to its fulcrum, said thermostat being of the tube and rod type, said thermostat being disposed adjacent the pilot jet and responsive to the pilot flame.

4. A thermostatically-controlled device for automatically shutting off the fuel supply to a main burner in response to an extinction of a pilot flame comprising: a body casting having a fuel passageway therethrough, a valve situated in said passageway and operative, when closed, to shut off the supply of fuel to said main burner, a spring for closing said valve, a trigger mechanism operative, when cocked, to hold said valve open and operative, upon being released, to permit said valve to be closed by its spring, and a thermostat operative in response to an extinction of the pilot flame to effect a release of said trigger mechanism whereby to effect a closure of said valve, said trigger mechanism comprising a rotatable shaft, a cam on said shaft in operative relation to said valve for opening and holding open said valve, a spring tending to rotate said shaft and said cam to a position wherein said valve is closed, said shaft and cam being manually rotatable against said last-mentioned spring, and latching means for holding said shaft and cam in cocked position subject to release in event of extinction of the pilot flame, said latching means including a latching member comprising a long lever arm and a short lever arm and a latch plate carried by said shaft, the free end of said long lever arm being latchingly engageable with said latch plate, said thermostat comprising a rod and a tube having different thermal coefficients of expansion, said rod being disposed inside said tube and connected at one end to said tube, the other end of said rod being in engagement with said short lever arm and operative to transmit rotational movement to said latching member and thereby cause said trigger mechanism to be released whenever the pilot flame is extinguished.

WAYNE E. JENKINS.